United States Patent [19]

Okumura

[11] Patent Number: 4,699,104
[45] Date of Patent: Oct. 13, 1987

[54] INTERNAL COMBUSTION ENGINE CYLINDER HEAD VARIABLE SWIRL SIAMESE TYPE INTAKE PORT STRUCTURE WITH BYPASS PASSAGE FROM STRAIGHT INTAKE PASSAGE COMMUNICATED BY GAP TO HELICAL INTAKE PASSAGE

[75] Inventor: Takeshi Okumura, Toyota, Japan

[73] Assignee: Toyota Jidosha Kabushiki Kaisha, Aichi, Japan

[21] Appl. No.: 869,890

[22] Filed: Jun. 3, 1986

[30] Foreign Application Priority Data

Jun. 13, 1985 [JP] Japan ................................. 60-129035

[51] Int. Cl.⁴ ............................................. F02B 31/00
[52] U.S. Cl. .................................... 123/308; 123/432; 123/188 M
[58] Field of Search .................... 123/188 M, 308, 432

[56] References Cited

U.S. PATENT DOCUMENTS

| 3,903,849 | 9/1975 | List et al. ............................ 123/308 |
| 4,457,272 | 7/1984 | Koga ..................................... 123/308 |
| 4,550,699 | 11/1985 | Okumura et al. .................... 123/308 |
| 4,586,469 | 5/1986 | Okumura et al. .................... 123/308 |

FOREIGN PATENT DOCUMENTS

| 0150025 | 9/1983 | Japan .................................... 123/308 |
| 0148229 | 9/1983 | Japan .................................... 123/308 |
| 0197420 | 11/1983 | Japan .................................... 123/308 |
| 0043922 | 3/1984 | Japan .................................... 123/308 |
| 0150425 | 8/1985 | Japan .................................... 123/308 |

Primary Examiner—Craig R. Feinberg
Assistant Examiner—David A. Okonsky
Attorney, Agent, or Firm—Parkhurst & Oliff

[57] ABSTRACT

A variable swirl siamese type intake port structure for an internal combustion engine cylinder head includes a first generally straight intake passage which leads to a first intake port and a second generally helical intake passage which leads to a second intake port which is formed with a helical end vortex portion. A control valve is fitted in the first generally straight intake passage at an upstream portion thereof so as to control its flow resistance. A bypass passage opens from a point downstream of the control valve in the first generally straight intake passage to the helical end vortex portion of the second intake port. And a downstream portion of the bypass passage is communicated to a downstream portion of the second generally helical intake passage. Thereby the resistance to flow of air-fuel mixture of the generally helical intake passage is diminished, and the engine volumetric efficiency and the maximum attainable engine output power are increased.

7 Claims, 5 Drawing Figures

INTERNAL COMBUSTION ENGINE CYLINDER HEAD VARIABLE SWIRL SIAMESE TYPE INTAKE PORT STRUCTURE WITH BYPASS PASSAGE FROM STRAIGHT INTAKE PASSAGE COMMUNICATED BY GAP TO HELICAL INTAKE PASSAGE

BACKGROUND OF THE INVENTION

The present invention relates to a variable swirl siamese type intake port structure for an internal combustion engine cylinder head, and more particularly relates to a siamesed such variable swirl siamese type intake port structure for an internal combustion engine cylinder head, which incorporates two intake valves and a switchover valve construction for selectively supplying intake air - fuel mixture to said valves in varying proportions, and which is improved as regards gas flow resistance and volumetric efficiency in various engine operational conditions.

The present patent application has been at least partly prepared utilizing materials which were disclosed in Japanese patent application Ser. No. 60-129035 (1985) and the present patent application hereby incorporates into itself by reference the disclosure of said Japanese Patent Application and of the claims and of the drawings thereof; a copy of said Japanese Patent Application is appended to this application.

In the prior art, there are various types of intake port structures for internal combustion engine cylinder heads, and in particular for so called siamese type cylinder heads. Such intake port structures typically are of the variable swirl siamese type, in which the siamesed intake port comprises a generally straight intake passage and a generally helical intake passage arranged in parallel with said generally straight intake passage, so that both said generally straight intake passage and also said generally helical intake passage receive supply of intake air - fuel mixture from the engine intake manifold, with a control valve selectively at least partially interrupting the flow of air - fuel mixture through said straight intake passage, so as selectively provide extra swirl for the intake air - fuel mixture being sucked into the combustion chamber of the engine, so as to improve combustibility, flame front propagation speed, and firing efficiency and thereby militate against engine knocking, thereby to allow the engine to be operated with a weaker intake air - fuel mixture than would otherwise be practicable. Such a construction typically includes a separating wall which divides between said generally straight intake passage and said generally helical intake passage. And a prior art to the present patent application, Japanese patent application Ser. No. 56-143215 which has been laid open as Japanese Patent Laying Open Publication Ser. No. 58-48715 and which was filed by an applicant the same as the applicant of the Japanese patent application of which the priority is being claimed in the present application and to whom either the present application is assigned or is owed a duty of assignment of the present application, discloses an improved siamesed type intake port structure for an internal combustion engine cylinder head which is provided with a bypass air passage through said separating wall, connecting a point on the generally straight intake passage downstream of said control valve provided therein to a vortex end wall of the generally helical intake passage.

With such an intake port structure for an internal combustion engine cylinder head, when the control valve is controlled to be in the closed state by a control system therefor, all of the air - fuel mixture sucked in by the combustion chamber of the engine is inhaled through the generally helical intake passage, and is accordingly imparted with strong swirling; this mode of operation is appropriate for when the engine is operating at low load, as during the idling engine operating condition. However, at this time the resistance presented to flow of air - fuel mixture by the generally helical intake passage alone is high. On the other hand, when the control valve is controlled to be in the open state by the control system therefor, most of the air - fuel mixture sucked in by the combustion chamber of the engine is inhaled through the generally straight intake passage with only a minor proportion thereof being inhaled through the generally helical intake passage, and accordingly the inhaled air - fuel mixture as a whole is imparted with relatively weak swirling, thus accordingly causing the volumetric efficiency of the engine to be high so as to develop good engine power; this mode of operation is appropriate for when the engine is operating at high load, such as full load. At this time the resistance presented to flow of air - fuel mixture by the combination of the generally straight intake passage and the generally helical intake passage is relatively low, and is improved by the provision of the above mentioned bypass air passage, according to the above identified prior proposal. However, the generally helical intake passage still has a relatively high resistance to flow of air - fuel mixture, and this is the greater the more said generally helical intake passage is constructed to provide strong swirl, so an obstacle is still presented to the desirable increase of engine output power.

SUMMARY OF THE INVENTION

Accordingly, it is the primary object of the present invention to provide a variable swirl siamese type intake port structure for an internal combustion engine cylinder head, which is improved over the prior art.

It is a further object of the present invention to provide such a variable swirl siamese type intake port structure for an internal combustion engine cylinder head, which allows engine output power to be enhanced.

It is a further object of the present invention to provide such a variable swirl siamese type intake port structure for an internal combustion engine cylinder head, the air - fuel mixture flow resistance of which is reduced when the generally straight intake passage is opened by the control valve therefor.

It is a further object of the present invention to provide such a variable swirl siamese type intake port structure for an internal combustion engine cylinder head, which has good characteristics with regard to engine volumetric efficiency.

According to the most general aspect of the present invention, these and other objects are accomplished by a variable swirl siamese type intake port structure for an internal combustion engine cylinder head, comprising: a first generally straight intake passage which leads to a first intake port and a second generally helical intake passage which leads to a second intake port formed with a helical end vortex portion; a control valve fitted in said first generally straight intake passage at an upstream portion thereof so as to control its flow resistance; and: a bypass passage, opening from a point downstream of said control valve in said first generally straight intake passage to said helical end vortex portion of said second intake port; characterized in that: a downstream portion of said bypass passage is communicated to a downstream portion of said second generally helical intake passage; and more particularly this variable swirl siamese type intake port structure for an internal combustion engine cylinder head may comprise a dividing wall which divides between said bypass passage and said second generally helical intake passage, wherein said communication between said downstream portion of said bypass passage and said downstream portion of said second generally helical intake passage is provided by a portion of said dividing wall being cut away to leave a gap. In this case, said dividing wall at its said cut away portion may be not completely cut away over its entire extent from one side of said generally helical intake passage to the other, but rather may partially remain on one said side of said generally helical intake passage. Desirably, this partially remaining portion of said dividing wall at its said cut away portion should be on the side of said generally helical intake passage opposite to said second intake port. The variable swirl siamese type intake port structure for an internal combustion engine cylinder head may comprise a first dividing wall an upstream end edge of which divides between said first generally straight intake passage and said second generally helical intake passage, and a second dividing wall an upstream end edge of which divides between said first generally straight intake passage and said bypass passage, in which case said upstream end edge of said second dividing wall may be offset towards the side of said generally straight intake passage from said upstream end edge of said first dividing wall; and the amount of said offset of said upstream and edge of said second dividing wall towards the side of said generally straight intake passage from said upstream end edge of said first dividing wall may be approximately 0.15 to 0.25 times the sum of the widths of said first generally straight intake passage and said second generally helical intake passage at their upstream end portions.

According to the present invention as described above, the fact that the bypass passage and the generally helical intake passage are communicated together at their downstream portions acts to increase the effective cross sectional area of said generally helical intake passage, thus diminishing the resistance to flow of air - fuel mixture of said generally helical intake passage, and thereby increasing the engine volumetric efficiency and the maximum attainable engine output power. Since desirably only a part of the dividing wall portion between the bypass passage and the generally helical intake passage is cut away, so that the roof portion of this dividing wall portion is allowed to remain as a hanging curtain type portion, said roof portion being the portion towards the opposite side of the generally helical intake passage from the outlet port thereof which opens into the engine combustion chamber, thereby the vortex producing action of said generally helical intake passage is not substantially deteriorated, and good swirling is produced for the air - fuel mixture sucked into the engine combustion chamber when the air - fuel mixture control valve is positioned to be in the closed condition.

Furthermore, the advantage gained by the particular feature that the upstream edge of the second dividing wall is somewhat offset to the side of the generally straight intake passage in relation to the upstream edge of the first dividing wall, the offset amount desirably being approximately 0.25 to 0.15 times the total width of the air - fuel mixture intake system at its upstream end, is that thereby it is made easier for the air - fuel mixture to go down into the bypass conduit, and accordingly again the resistance to flow of air - fuel mixture of the generally helical intake passage is diminished, and thereby the engine volumetric efficiency and the maximum attainable engine output power are further desirably increased.

BRIEF DESCRIPTION OF THE DRAWINGS

The present invention will now be shown and described with regard to the preferred embodiment thereof, and with reference to the illustrative drawings, which however should not be considered as limitative of the present invention in any way, since the scope of the present invention is to be considered as being delimited solely by the accompanying claims, rather than by any particular features of the disclosed embodiment or of the drawings. In these drawings:

DESCRIPTION OF THE PREFERRED EMBODIMENT

Figure 1:
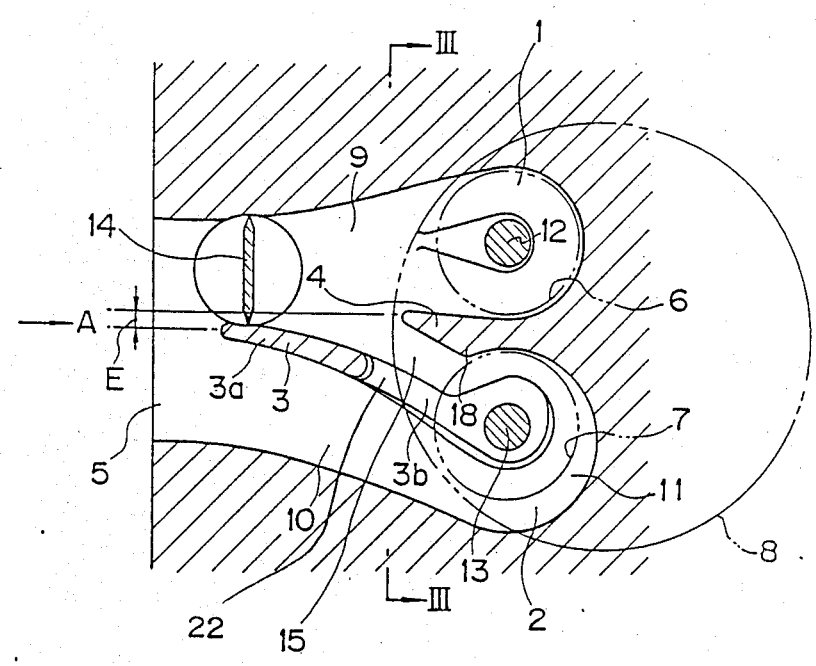
FIG. 1 is a transverse sectional view through an internal combustion engine cylinder head incorporating the preferred embodiment of the variable swirl siamese type intake port structure of the present invention, as seen from underneath the cylinder head looking upwards, the sectional plane of this drawing being somewhat distorted for the convenience of explanation but being generally indicated by the arrows I—I in FIG. 2.
Figure 4:
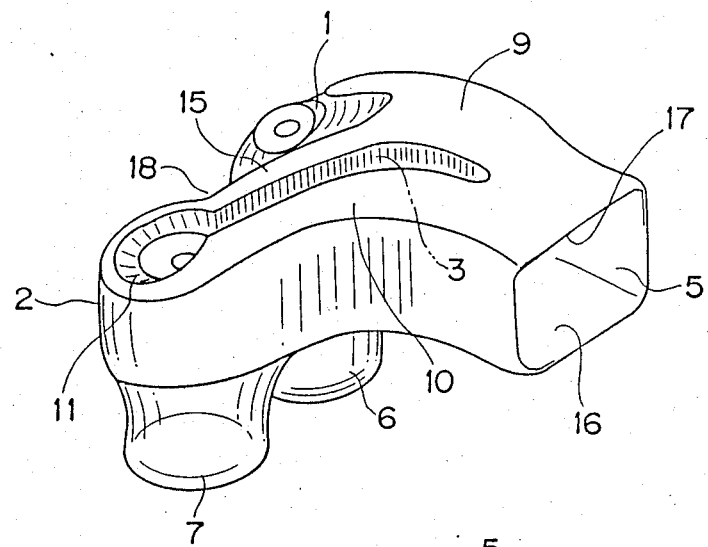
FIG. 4 is a perspective view of the port structure of the cylinder head of FIGS. 1 through 3 which is shown as solid, as seen from a point below and to the left of FIG. 1 and behind the drawing paper of said figure, above the cylinder head.
Figure 5:
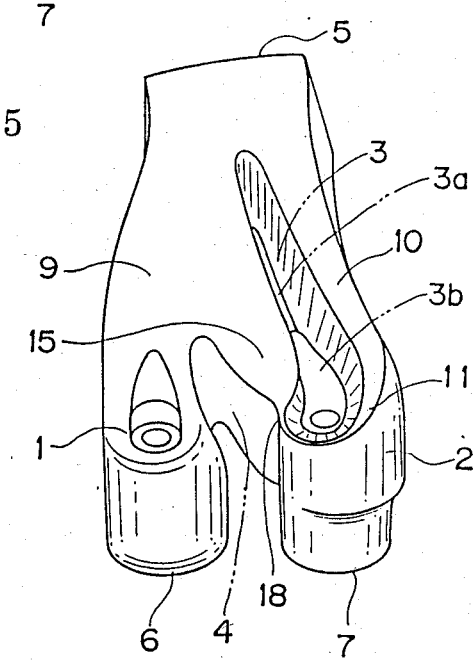
FIG. 5 is another perspective view of said port structure of the cylinder head of FIGS. 1 through 3 which is shown as solid, as seen from a point to the right of FIG. 1 and behind the drawing paper of said figure, above the cylinder head.

The present invention will now be described with reference to the preferred embodiment thereof. In FIG. 1 which shows the preferred embodiment of the variable swirl siamese type intake port structure of the present invention, as provided to an engine cylinder head, in transverse sectional view looking upwards, the reference numeral 9 denotes a generally straight intake passage and the reference numeral 10 denotes a generally helical intake passage; the flow of air - fuel mixture which is being sucked into the combustion chamber (denoted as 8) of the engine from the intake manifold (not particularly shown) first enters the cylinder head into an air - fuel mixture intake 5 and then is divided by impinging upon the upstream edge of a first dividing wall 3, so that part of said air - fuel mixture flow enters into the upstream end of the generally straight intake passage 9 while the remainder of said air - fuel mixture flow enters into the upstream end of the generally helical intake passage 10. Another second dividing wall 4 further defines the separation between the generally straight intake passage 9 and the generally helical intake passage 10. As best seen in the perspective views shown in FIGS. 4 and 5 of this cylinder head port structure in which the empty spaces are shown as solid and vice versa, the generally straight intake passage 9 debouches into a straight intake port 1 and then through a first air - fuel mixture outlet 6 into the combustion chamber 8, said outlet 6 defining a first intake valve seat which is controlled with regard to its opening and closing by a first intake poppet valve 12 of a per se known construction, while the generally helical intake passage 10 debouches into a helical intake port 2 and then through a second air - fuel mixture outlet 7 into said combustion chamber 8, said second outlet 7 similarly defining a second intake valve seat which is controlled with regard to its opening and closing by a second intake poppet valve 13 also of a per se known construction.

Figure 2:
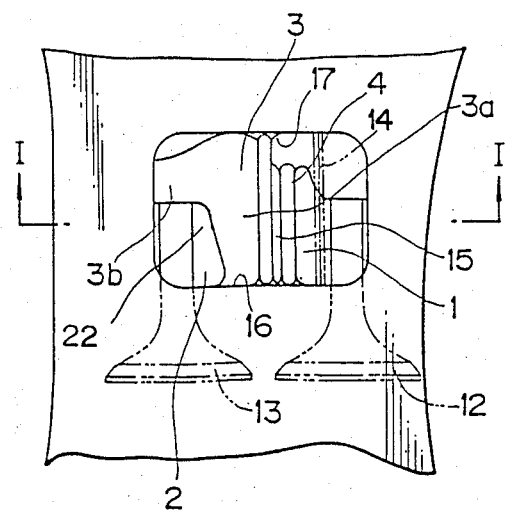
FIG. 2 is a view of the cylinder head of FIG. 1 from outside, as seen looking in the direction of the arrow A in FIG. 1, with certain parts shown by phantom lines.
Figure 3:
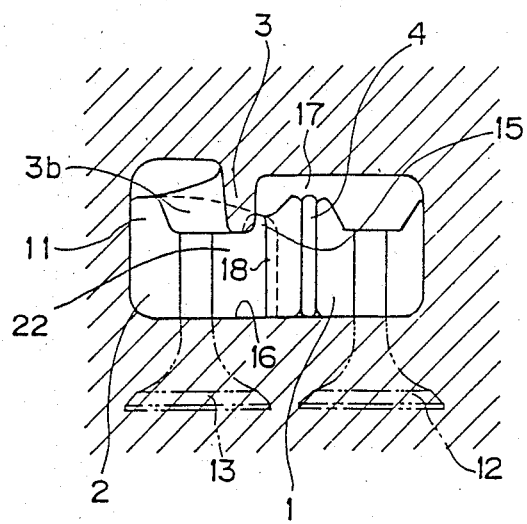
FIG. 3 is a sectional view of the cylinder head of FIGS. 1 and 2, again with certain parts shown by phantom lines.

Thus, the right side as seen in the view of FIG. 2 of the air - fuel mixture intake 5 is communicated on the right sides in that figure of the first dividing wall 3 and the second dividing wall 4 with the straight intake port 1 and via the first air - fuel mixture outlet 6 past the first intake poppet valve 12 to the combustion chamber 8, substantially in a straight line manner, thus defining the generally straight intake passage 9; while on the other hand the left side as seen in FIG. 2 of the air - fuel mixture intake 5 is communicated on the left sides in that figure of the first dividing wall 3 and the second dividing wall 4 with the helical intake port 2 and via the second air - fuel mixture outlet 7 past the second intake poppet valve 13 to the combustion chamber 8, while angling to the left in FIG. 2 (downwards as seen in FIG. 1), thus defining the generally helical intake passage 10, so that air - fuel mixture flowing through this generally helical intake passage 10 impinges against a vortex portion 11 formed around the stem of the second intake poppet valve 13 in the helical port 2 and is imparted with substantial swirling motion.

In the upstream end or intake end of the generally straight intake passage 9 there is provided a butterfly type air - fuel mixture intake control valve 14, which is fixedly mounted on a shaft not particularly shown and is selectively positioned via said shaft by an actuating device of a per se well known sort, likewise not particularly shown, to either one of a closed position as shown in FIG. 1 in which said air - fuel mixture intake control valve 14 substantially closes said upstream end of said generally straight intake passage 9 while of course leaving uninterfered with said generally helical intake passage 10, or an open position, angularly spaced approximately 90° from said shown closed position, in which said air - fuel mixture intake control valve 14 substantially leaves said upstream end of said generally straight intake passage 9 open and uninterfered with.

From the left side of the generally straight intake passage 9 as seen in FIG. 2, i.e. from its side towards the generally helical intake passage 10, just after the air - fuel mixture intake control valve 14, there diverges a bypass passage 15. This bypass passage 15 is separated from the generally helical intake passage 10 by the first dividing wall 3, as can best be seen from the FIG. 4 and FIG. 5 views, and runs generally parallel to said generally helical intake passage 10. Further, said bypass passage 15 is separated from the generally straight intake passage 9 by the second dividing wall 4, and extends at an angle to said generally straight intake passage 9. The downstream end of this bypass passage 15 opens to the vortex portion 11 formed around the stem of the second intake poppet valve 13 in the helical port 2.

The second dividing wall 4, along its entire extent from its upstream edge portion to its base portion, is formed so as completely to divide between the generally straight intake passage 9 and the generally helical intake passage 10; in other words, said second dividing wall 4, entirely along its length, extends completely between the floor 16 of the intake passages 9 and 10 and their ceiling 17, as best seen in FIG. 2. On the other hand, the first dividing wall 3 does not extend completely between the floor 16 and the ceiling 17 along the entire longitudinal extent of said first dividing wall 3; on the contrary, particularly according to the inventive concept of the present invention, while the upstream portion 3a of said first dividing wall 3 does indeed extend completely between the floor 16 and the ceiling 17, nevertheless the portion 3b downstream from a certain intermediate point of the first dividing wall 3 does not extend completely between the floor 16 and the ceiling 17, but rather said portion 3b abuts to the ceiling 17 of the intake passages 9 and 10 but does not reach to their floor 16, leaving thus a gap 22 opening between the hanging fringe of said downstream first wall portion 3b and the floor 16, said gap 22 communicating the lower side (from the point of view of FIG. 2) of the bypass passage 15 with the lower side of the downstream portion of the generally helical intake passage 10. Thus, this portion 3b of the first dividing wall 3 merely constitutes a hanging divider or curtain like portion.

Particularly according to a detailed concept of the shown construction, the upstream edge of the second dividing wall 4, i.e. its end edge closest to the air - fuel mixture intake 5, is somewhat offset to the side of the generally straight intake passage 9 in relation to the upstream edge of the first dividing wall 3, by an amount denoted by "E" as shown in FIG. 1. This offset amount "E" should desirably be approximately 0.25 to 0.15 times the width of the air - fuel mixture intake 5. Also, at the downstream end of the bypass passage 5, where it opens to the vortex portion 11 formed around the stem of the second intake poppet valve 13 in the helical port 2, there is clearly formed a dividing ridge 18, which thus clearly delimits between these two structures.

This variable swirl siamese type intake port structure functions as will now be described.

When the air - fuel mixture intake control valve 14 is controlled by the aforementioned control system, not shown, therefor to be in its closed position as shown in FIG. 1, and the upstream end or intake of the generally straight intake passage 9 is substantially closed, then all the air - fuel mixture sucked into the combustion chamber 8 is perforce inhaled from the air - fuel mixture intake 5, around the left side of the upstream edge of the dividing wall portion 3a as seen in FIG. 2, down along the generally helical intake passage 10, and flows into the helical intake port 2 and is imparted with substantial swirling action therein while being mainly guided by the vortex portion 11 formed around the stem of the second intake poppet valve 13 in said helical port 2 as well as by the outer wall of said helical port 2, before finally flowing through the second air - fuel mixture outlet 7 into the combustion chamber 8, under the control of the second intake poppet valve 13. Thus a swirling action is provided for the air - fuel mixture in the combustion chamber 8 in the anticlockwise direction as seen in FIG. 1. The generally helical intake passage 10 is opened to the bypass passage 15 at its floor 16 side through the gap 22 past the hanging curtain portion 3b, but in this valve 14 closed situation this does not cause any substantial reduction in the swirl provided by the vortex portion 11 of the helical port 2, and good swirl action is still provided for the air - fuel mixture inhaled into the combustion chamber 8.

On the other hand, when the air - fuel mixture intake control valve 14 is controlled by the aforementioned control system therefor to be in its open position approximately 90° away from its position as shown in FIG. 1, so that the upstream end or intake of the generally straight intake passage 9 is substantially opened, then the air - fuel mixture sucked into the combustion chamber 8 is inhaled from the air - fuel mixture intake 5, and is divided into two flows. The weaker one of these flows passes as before around the left side of the upstream edge of the dividing wall portion 3a as seen in FIG. 2, down along the generally helical intake passage 10, and flows into the helical intake port 2 and is imparted with substantial swirling action therein while being mainly guided by the vortex portion 11 formed around the stem of the second intake poppet valve 13 in said helical port 2 as well as by the outer wall of said helical port 2, before finally flowing through the second air - fuel mixture outlet 7 into the combustion chamber 8, under the control of the second intake poppet valve 13, thus providing a certain swirling action for this portion of the air - fuel mixture in the combustion chamber 8 in the anticlockwise direction as seen in FIG. 1. However, the stronger one of these flows passes around the right side of said upstream edge of the dividing wall portion 3a as seen in FIG. 2, past the air - fuel mixture intake control valve 14 which is in the opened condition, down along the generally straight intake passage 9, and flows into the straight intake port 1 and is not imparted with any substantial swirling action therein, before finally flowing through the first air - fuel mixture outlet 6 into the combustion chamber 8, under the control of the first intake poppet valve 12, with substantially no swirling action being provided for this portion of the air - fuel mixture in the combustion chamber 8. Also, a portion of this air - fuel mixture flow in the generally straight intake passage 9 is diverted past the right side as seen in FIG. 2 of the upstream edge of the second dividing wall portion 4 into the bypass passage 15, and flows down said bypass passage 15 to its downstream end, to be ejected therefrom and to impact against the end wall portion of the vortex portion 11 formed around the stem of the second intake poppet valve 13 in the helical port 2, thereby to weaken the swirling effect occurring in this helical port 2. Weakening this swirling effect increases the volumetric efficiency of the internal combustion engine. Further, the provision of the gap 22 past the hanging curtain portion 3b of the first dividing wall 3 from the bypass passage 15 into the generally helical intake passage 10 at the downstream end of said generally helical intake passage 10 near the helical port 2 acts to increase the effective cross sectional area of said genrally helical intake passage 10, thus diminishing the resistance to flow of air - fuel mixture of said generally helical intake passage 10, and thereby further increasing the engine volumetric efficiency and the maximum attainable engine output power. It is important and desirable, in this connection, that only part of the dividing wall portion 3b between the bypass passage 15 and the generally helical intake passage 10 is cut away to make the gap 22: if the whole of the downstream portion of this dividing wall portion 3b were cut away, then the swirl producing effect of the generally helical intake passage 10, when the air - fuel mixture control valve 14 is closed, would be seriously deteriorated. But, because the roof portion of this dividing wall portion 3b is allowed to remain as a hanging curtain type portion, said roof portion being the portion towards the opposite side of the generally helical intake passage 10 from the second air - fuel mixture outlet 7 which opens into said combustion chamber 8, thereby the vortex producing action of said generally helical intake passage 10 is not substantially deteriorated, and good swirling is produced for the air - fuel mixture sucked into the engine combustion chamber 8 when the air - fuel mixture control valve 14 is positioned to be in the closed condition.

The advantage gained by the particular detailed shown constructional feature that the upstream edge of the second dividing wall 4 is somewhat offset to the side of the generally straight intake passage 9 in relation to the upstream edge of the first dividing wall 3 by the amount "E" as shown in FIG. 1, said offset amount "E" desirably being approximately 0.25 to 0.15 times the width of the air - fuel mixture intake 5, is that thereby it is made easier for the air - fuel mixture to go down into the bypass conduit 15, and accordingly again the resistance to flow of air - fuel mixture of said generally helical intake passage 10 is diminished, and thereby the engine volumetric efficiency and the maximum attainable engine output power are further desirably increased.

Although the present invention has been shown and described in terms of the preferred embodiment thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the legitimate and properly interpreted scope of the accompanying claims, which follow.

What is claimed is:

1. A variable swirl siamese type intake port structure for an internal combustion engine cylinder head, comprising:

a first generally straight intake passage which leads to a first intake port and a second generally helical intake passage which leads to a second intake port formed with a helical end vortex portion;

a control valve fitted in said first generally straight intake passage at an upstream portion thereof so as to control its flow resistance; and:

a bypass passage, opening from a point downstream of said control valve in said first generally straight intake passage to said helical end vortex portion of said second intake port;

characterized in that:

a downstream portion of said bypass passage is communicated to a downstream portion of said second generally helical intake passage.

2. A variable swirl siamese type intake port structure for an internal combustion engine cylinder head according to claim 1, comprising a dividing wall which divides between said bypass passage and said second generally helical intake passage, and wherein said communication between said downstream portion of said bypass passage and said downstream portion of said second generally helical intake passage is provided by a portion of said dividing wall being cut away to leave a gap.

3. A variable swirl siamese type intake port structure for an internal combustion engine cylinder head according to claim 2, wherein said dividing wall at its said cut away portion is not completely cut away over its entire extent from one side of said generally helical intake passage to the other, but rather partially remains on one said side of said generally helical intake passage.

4. A variable swirl siames type intake port structure for an internal combustion engine cylinder head according to claim 3, wherein the partially remaining portion of said dividing wall at its said cut away portion is on the side of said generally helical intake passage opposite to said second intake port.

5. A variable swirl siamese type intake port structure for an internal combustion engine cylinder head according to claim 1, comprising a first dividing wall an upstream end edge of which divides between said first generally straight intake passage and said second generally helical intake passage, and a second dividing wall an upstream end edge of which divides between said first generally straight intake passage and said bypass passage.

6. A variable swirl siamese type intake port structure for an internal combustion engine cylinder head according to claim 5, wherein said upstream end edge of said second dividing wall is offset towards the side of said generally straight intake passage from said upstream end edge of said first dividing wall.

7. A variable swirl siamese type intake port structure for an internal combustion engine cylinder head according to claim 6, wherein the amount of said offset of said upstream end edge of said second dividing wall towards the side of said generally straight intake passage from said upstream end edge of said first dividing wall is approximately 0.15 to 0.25 times the sum of the widths of said first generally straight intake passage and said second generally helical intake passage at their upstream end portions.

* * * * *